(12) United States Patent
Harres

(10) Patent No.: US 8,044,812 B2
(45) Date of Patent: Oct. 25, 2011

(54) OPTICAL WIRELESS SENSOR NETWORK

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 12/352,221

(22) Filed: Jan. 12, 2009

(65) Prior Publication Data

US 2010/0176939 A1 Jul. 15, 2010

(51) Int. Cl.
*G08B 21/00* (2006.01)
(52) U.S. Cl. ...... 340/619; 340/588; 340/539.1; 340/589; 398/118; 398/128; 398/135; 398/140; 398/159
(58) Field of Classification Search ........... 340/619, 340/588, 539.1, 589; 398/118, 128, 135, 398/140, 159
See application file for complete search history.

(56) References Cited

U.S. PATENT DOCUMENTS

| 7,593,642 B2* | 9/2009 | Loechner | 398/128 |
| 2006/0133814 A1* | 6/2006 | Hayashi | 398/135 |
| 2010/0061734 A1* | 3/2010 | Knapp | 398/128 |

\* cited by examiner

*Primary Examiner* — Tai T Nguyen
(74) *Attorney, Agent, or Firm* — Matthew L. Balkenbusch

(57) ABSTRACT

A wireless sensor network including a receiver including a photodetector, and a sensor node that includes a sensor configured to sense a property, a transmitter configured to emit outgoing optical energy, the outgoing optical energy being indicative of the property, and a photodetector configured to harvest incoming optical energy and convert the incoming optical energy into electrical energy useful by the transmitter, wherein the photodetector of the receiver is positioned to receive the outgoing optical energy.

19 Claims, 4 Drawing Sheets

OPTICAL WIRELESS SENSOR NETWORK

FIELD

The present patent application relates to sensor networks and, more particularly, to optical sensor networks that communicate and receive power wirelessly without producing a detectable radio frequency signature.

BACKGROUND

Currently, hundreds of temperature sensors are attached to satellites during ground testing. The temperature sensors require power lines for receiving electrical energy and communication lines for transmitting temperature readings to, for example, a central processor. However, the weight of the power and communication lines and associated components significantly contributes to the overall weight of the satellite. Therefore, the temperature sensors typically are removed prior to launch to reduce the overall weight of the satellite and, as a result, reduce the costs associated with launching the satellite.

The removal of temperature sensors described above is a delicate and tedious process that typically requires hundreds of man-hours to complete. Therefore, it would be desirable to avoid the time, difficulty and expense associated with removing temperature sensors from satellites prior to launch.

One solution is to use temperature sensors that are powered wirelessly and communicate with a receiver wirelessly, thereby eliminating the excess weight associated with power and communication lines.

Known wireless temperature sensor systems typically include a radio frequency ("RF") transmitter that uses a standard transmission protocol such as ZIGBEE®, BLUETOOTH® or active radio frequency identification ("RFID"). However, in certain applications, such as defense satellites, there is a concern about RF leakage and, in particular, the potential detection of RF leakage by an adversary. Therefore, it would be desirable to avoid creating a detectable RF signature. Indeed, certain users have outright bans on the use of RF communication.

Accordingly, there is a need for a sensor network that is powered wirelessly, communicates wirelessly, and does not produce a detectable RF signature.

SUMMARY

In one aspect, the disclosed wireless sensor network may include a receiver including a photodetector, and a sensor node that includes a sensor configured to sense a property, a transmitter configured to emit outgoing optical energy, the outgoing optical energy being indicative of the property, and a photodetector configured to harvest incoming optical energy and convert the incoming optical energy into electrical energy useful by the transmitter, wherein the photodetector of the receiver is positioned to receive the outgoing optical energy In another aspect, the disclosed wireless sensor network may include a receiver including a photodetector and a transmitter, the transmitter being configured to transmit a beacon, and a plurality of sensor nodes, each sensor node including a sensor configured to sense a property, a transmitter configured to emit outgoing optical energy, the outgoing optical energy being indicative of the property, and a photodetector positioned to receive the beacon and to harvest incoming optical energy, wherein the incoming optical energy is converted into electrical energy useful by the transmitter of the sensor node, wherein the transmitters of the sensor nodes are configured to emit the outgoing optical energy in response to signals communicated by the beacon, and wherein the photodetector of the receiver is positioned to receive the outgoing optical energy.

Other aspects of the disclosed optical wireless sensor network will become apparent from the following description, the accompanying drawings and the appended claims.

DETAILED DESCRIPTION

Figure 1:
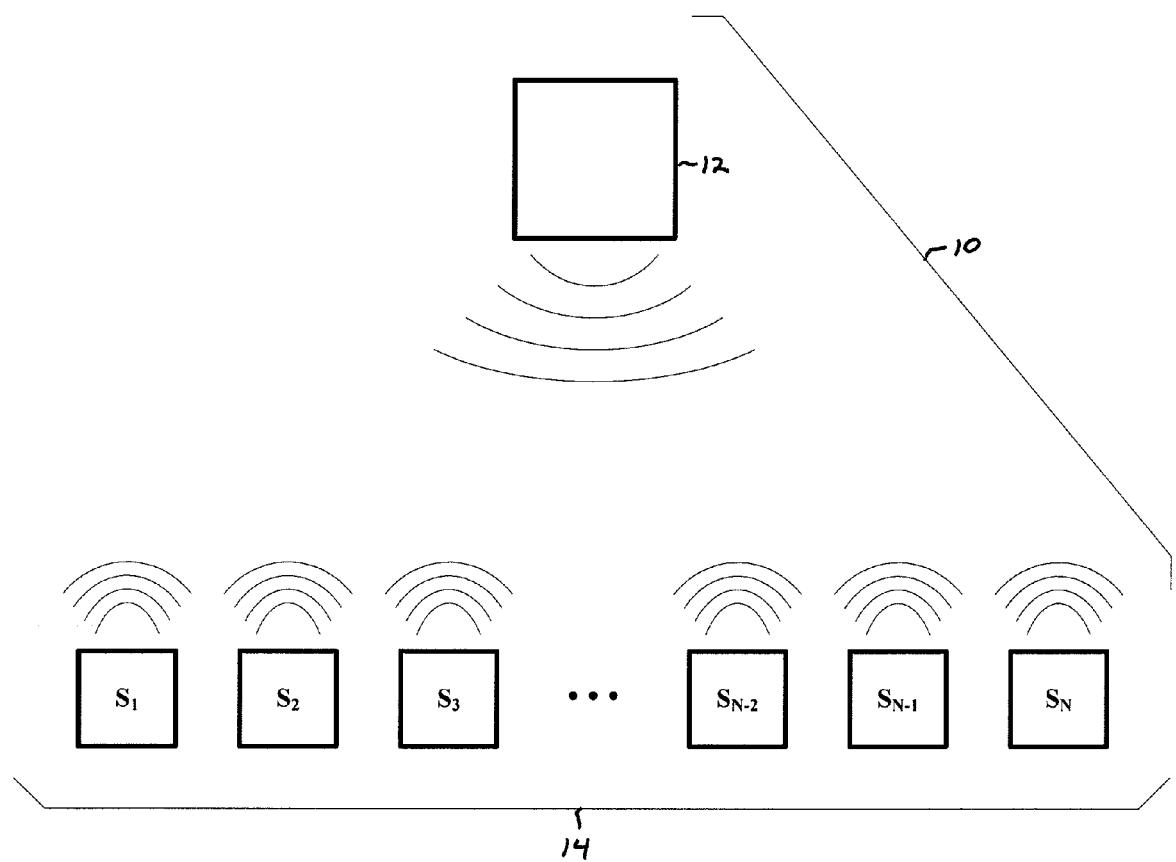
FIG. 1 is an diagrammatical view of one aspect of the disclosed optical wireless sensor network.

As shown in FIG. 1, one aspect of the disclosed optical wireless sensor network, generally designated 10, may include a receiver 12 and an array 14 of N number of sensor nodes S (shown as sensor nodes $S_1$ to $S_N$ in FIG. 1). However, those skilled in the art will appreciate that an alternative aspect of the disclosed optical wireless sensor network (not shown) may include a receiver and only one sensor node (i.e., N=1). The number N of sensor nodes $S_1$-$S_N$ in the array 14, as well as the relative location and positioning of the sensor nodes $S_1$-$S_N$ relative to the receiver 12, may be dictated by design considerations of the user and is limited only by the need for the sensor nodes $S_1$-$S_N$ to wirelessly communicate with the receiver 12, as is discussed in greater detail herein.

The sensor nodes $S_1$-$S_N$ may be mounted on a target subject (not shown) or positioned relative to a target subject. The target subject may be any device, substrate, body or fluid having a property capable of being measured by the sensor nodes $S_1$-$S_N$. As one specific and non-limiting example, the target subject may be a satellite.

Figure 2:
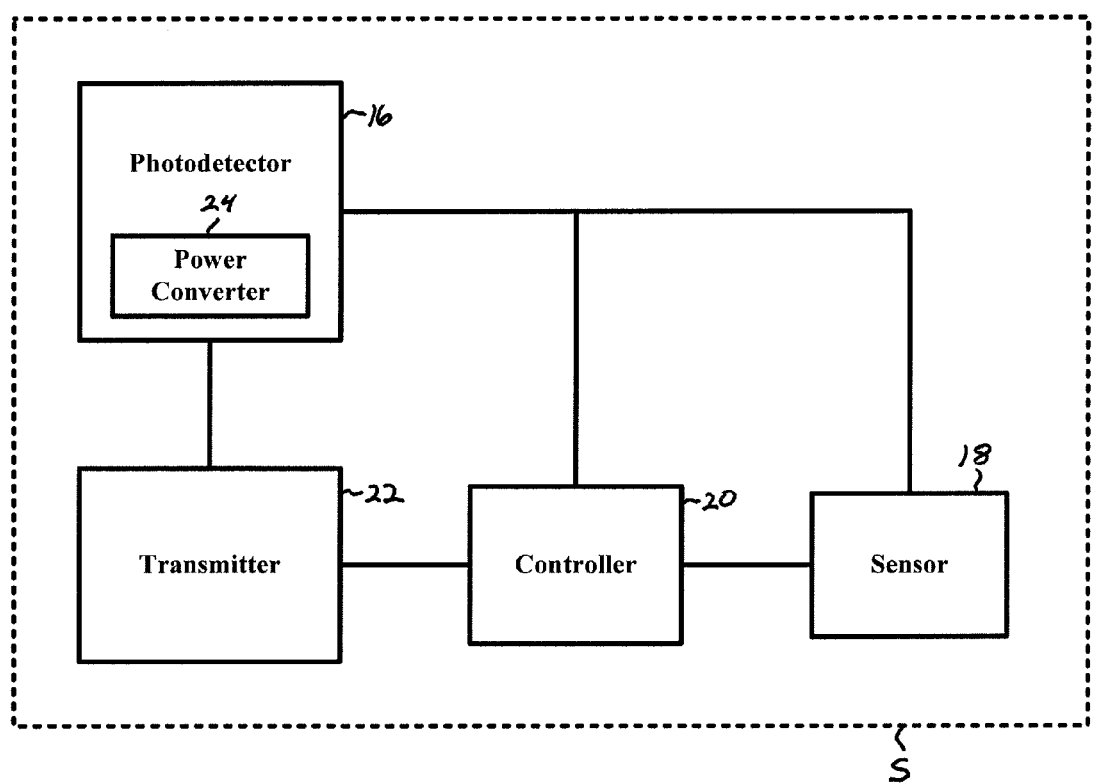
FIG. 2 is a block diagram of a sensor node of the optical wireless sensor network of FIG. 1.

Referring to FIG. 2, each sensor node S in the array 14 may include a photodetector 16, a sensor 18, a controller 20 and a transmitter 22. Additionally, the sensor node S may include a housing (not shown) or other appropriate structure to at least partially receive the photodetector 16, the sensor 18, the controller 20 and the transmitter 22, thereby protecting the components and electronics of the sensor node S from the environment. Those skilled in the art will appreciate that the sensor node S may include additional components and functionalities without departing from the scope of the present disclosure.

The photodetector 16 of the sensor node S may be any device or circuitry capable of harvesting optical energy, communicating the harvested optical energy to the controller 20, and converting the harvested optical energy into a useable voltage. The voltage generated by the photodetector 16 may be applied to the sensor 18, the controller 20 and the transmitter 22 to power the sensor node S as will be described.

An example of a useful photodetector 16 is the PDB-C110 available from Advanced Photonix of Ann Arbor, Mich.

In one aspect, the photodetector 16 may include a power converter 24, such as a DC to DC converter, for regulating the output of the photodetector 16 to a voltage useful by the sensor 18, the controller 20 and the transmitter 22 of the sensor node S. The power converter 24 may be configured to handle a large variation in input voltage since the voltage input to the power converter 24 is generated by light harvested by the photodetector 16, the intensity of which may vary substantially. At this point, those skilled in the art will appreciate that the power converter 24 need not be integral with the photodetector 16, but rather can be a separate component of the sensor node S.

The sensor 18 of the sensor node S may be any device or circuitry capable of measuring a physical property of the target subject and communicating the measurement to the controller 20. In one aspect, the sensor 18 may be configured to directly measure the physical property of the target subject (e.g., temperature may be measured directly with a thermometer). In another aspect, the sensor 18 may be configured to indirectly measure the physical property (e.g., strain may be measured indirectly by detecting voltage changes in a piezoelectric material positioned in the target subject and correlating the voltage change into a force value).

Examples of physical properties capable of being measured by the sensor 18 include temperature, pressure, electrical conductivity, instantaneous position/velocity/acceleration and mechanical strain. However, those skilled in the art will appreciate that any physical properties capable of being measured by a sensor may be measured using the sensor 18.

In one particular aspect, the sensor 18 may be an integrated circuit temperature sensor configured to output a voltage proportional to the temperature. (Note: either the sensor 18 or the controller 20 may convert the voltage output into a temperature.) A specific example of an appropriate sensor 18 is the LM35 precision centigrade temperature sensor available from National Semiconductor of Santa Clara, Calif.

The controller 20 of the sensor node S may be any processing device capable of receiving signals from the photodetector 16 and the sensor 18, and generating and communicating command signals to the transmitter 22. In one particular aspect, the controller 20 may be a microprocessor or the like.

The transmitter 22 of the sensor node S may be any device or circuitry capable of emitting optical energy in response to signals received from the controller 20. In one particular aspect, the transmitter 22 may be any device or circuitry configured to emit light. For example, the transmitter 22 may be a light emitting diode ("LED") or an array of LEDs. The wavelength of the light emitted by the transmitter 22 may be selected based upon design considerations of the user and, for example, may be in the visible range, the infrared range or in the ultraviolet range.

Figure 3:
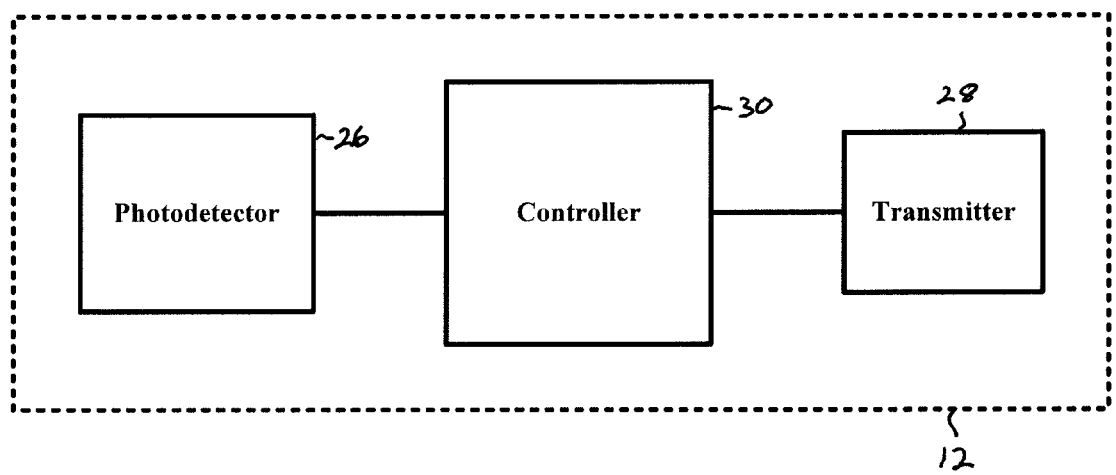
FIG. 3 is a block diagram of the receiver of the optical wireless sensor network of FIG. 1.

Referring to FIG. 3, the receiver 12 may include a photodetector 26, a transmitter 28 and a controller 30. In one aspect, the photodetector 26, the transmitter 28 and the controller 30 may be housed within a single receiver unit/device. In another aspect, the transmitter 28 may be physically separated from the controller 30.

The controller 30 of the receiver 12 may be any processing device capable of receiving signals from the photodetector 26 and generating and communicating command signals to the transmitter 28. In one particular aspect, the controller 30 may be a microprocessor or the like.

Furthermore, the controller 30 of the receiver 12 may facilitate communication between a user and the network 10. For example, the controller 30 may be in communication with an external user interface (not shown), such as a computer system.

The photodetector 26 of the receiver 12 may be any device or circuitry capable of harvesting optical energy and communicating the harvested optical energy to the controller 30. In one aspect, the photodetector 26 may also generate a voltage to power the receiver, as is described above. In another aspect, the receiver 12 may be externally powered by, for example, a battery pack or a connection to an electric grid.

The transmitter 28 of the receiver 12 may be any device or circuitry capable of emitting optical energy in response to signals received from the controller 30. In one particular aspect, the transmitter 28 may be any device or circuitry configured to emit light. For example, the transmitter 28 may be an LED or an array of LEDs. Therefore, the transmitter 28 may provide optical energy to power the sensor nodes $S_1$-$S_N$. Furthermore, the transmitter 28 may serve as a beacon that transmits optical energy to communicate with the sensor nodes $S_1$-$S_N$, as will be described.

Thus, each of the sensor nodes $S_1$-$S_N$ of the array 14 may be powered wirelessly by harvesting optical energy by way of the photodetectors 16, whether that optical energy is ambient light or optical energy emitted from the transmitter 28 of the receiver 12, and converting the harvested optical energy into a useable voltage.

In one aspect, each of the sensor nodes $S_1$-$S_N$ may independently initiate data transmissions to the receiver 12. In particular, the sensors 18 of each of the sensor nodes $S_1$-$S_N$ may take measurements and communicate the measurements to the associated controllers 20. Each controller 20 may then instruct the associated transmitter 22 to actuate (i.e., emit optical energy) in a particular manner (e.g., in a predetermined communication language) that is indicative of the transmitting sensor node $S_1$-$S_N$ and the measurement data taken by the transmitting sensor node $S_1$-$S_N$.

At this point, those skilled in the art will appreciate that the transmissions by the sensor nodes $S_1$-$S_N$ may communicate additional data (e.g., error messages and power levels) without departing from the scope of the present disclosure. Furthermore, those skilled in the art will appreciate that the transmissions by the sensor nodes $S_1$-$S_N$ may be presented in a standard communication language (e.g., Morse code) or may be presented in an encrypted communication language.

The photodetector 26 of the receiver 12 may detect the optical energy transmitted by the transmitting sensor node $S_1$-$S_N$ and may communicate the incoming signals to the controller 30. The controller 30 may read the incoming signals as a measurement associated with a particular sensor node (or nodes) $S_1$-$S_N$ of the array 14.

Figure 4:
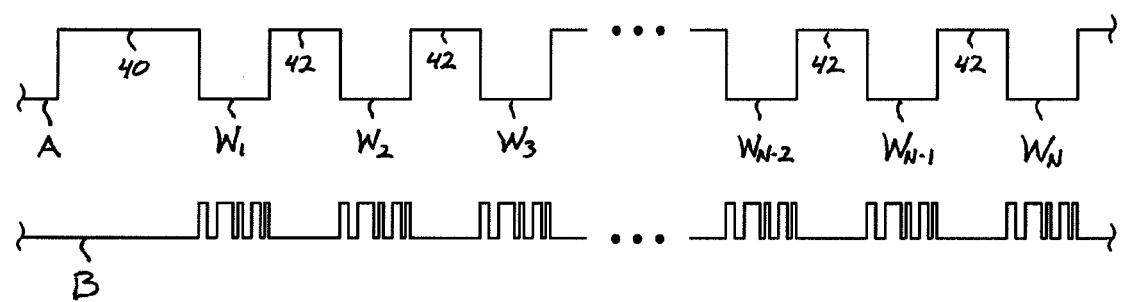
FIG. 4 is a graphical illustration of one aspect of a transmission sequence of the disclosed optical wireless sensor network.

As the number N of sensor nodes $S_1$-$S_N$ in the array 14 increases, it may be necessary to organize the transmittal of data between the sensor nodes $S_1$-$S_N$ and the receiver 12 in a non-interfering sequence. Therefore, in another aspect, the receiver 12 may initiate a transmission sequence with the sensor nodes $S_1$-$S_N$ of the array 14, as shown in FIG. 4. Plot A in FIG. 4 represents the transmission of the transmitter 28 of the receiver 12 and plot B in FIG. 4 represents the incoming data transmissions received by the photodetector 26 of the receiver 12.

Still referring to FIG. 4, a new transmission sequence between the sensor nodes $S_1$-$S_N$ and the receiver 12 may be initiated when the controller 30 of the receiver 12 instructs the transmitter 28 of the receiver 12 to transmit a start-of-sequence pulse 40. The start-of-sequence pulse 40 may be followed by a series of transition pulses 42 that separate communication windows $W_1$-$W_N$. Each sensor node $S_1$-$S_N$ may be assigned one or more communication windows $W_1$-$W_N$ in which to transmit its latest measurement data to the receiver 12.

As an example only, sensor node $S_1$ may transmit data during communication window $W_1$, sensor node $S_2$ may transmit data during communication window $W_2$, sensor node $S_3$ may transmit data during communication window $W_3$, sensor node $S_{N-2}$ may transmit data during communication window $W_{N-2}$, sensor node $S_{N-1}$ may transmit data during communication window $W_{N-1}$, and sensor node $S_N$ may transmit data during communication window $W_N$.

Thus, the start-of-sequence pulse 40, the transition pulses 42 and, ultimately, the communication windows $W_1$-$W_N$, may be detected by the photodetectors 16 of each of the sensor nodes $S_1$-$S_N$ and communicated to the associated controllers 20. Then, as each sensor node $S_1$-$S_N$ identifies its associated communication window (or windows) $W_1$-$W_N$, the controller 20 of the sensor node (or nodes) $S_1$-$S_N$ instructs the associated transmitter 22 to transmit the latest measurement data received from the associated sensor 18 (e.g., all measurements taken since the last opportunity to transmit).

Optionally, data compression may be used to minimize the number of bits being stored and transmitted by the sensor nodes $S_1$-$S_N$ between successive data transmissions. Data compression may be particularly useful when the measurements are highly correlated (e.g., when temperature changes will not occur rapidly). One example of a useful, simple and powerful form of compression is adaptive differential pulse code modulation ("ADPCM").

At this point, those skilled in the art will appreciate that the start-of-sequence pulse 40 and the transition pulses 42 shown in FIG. 4 are not necessarily off-to-on pulses (i.e., not necessarily 0-to-1), but rather may be partially-on-to-full-on pulses (e.g., 0.2-to-0.5 or 0.5-to-1) or the like. Likewise, the transmissions from the sensor $S_1$-$S_N$ nodes are not necessarily off-to-on pulses/sequences.

Accordingly, the disclosed optical wireless sensor network 10 provides an array 14 of sensor nodes $S_1$-$S_N$ that, in addition to being powered wirelessly, may wirelessly communicate with a receiver 12 by actuating the transmitters 22 of the sensor nodes $S_1$-$S_N$ to emit optical energy using a particular communication language and detecting the emitted optical energy with the photodetector 26 of the receiver 12. Furthermore, since the communications between the sensor nodes $S_1$-$S_N$ and the receiver 12 are made using optical energy, the network 10 does not generate a detectable RF signature.

Although various aspects of the disclosed optical wireless sensor network have been shown and described, modifications may occur to those skilled in the art upon reading the specification. The present application includes such modifications and is limited only by the scope of the claims.

What is claimed is:

1. A wireless sensor network comprising:
   a receiver including a photodetector; and
   an array of sensor nodes positioned on a target subject, wherein each sensor node includes
      a sensor configured to sense a property of said target subject,
      a transmitter configured to emit outgoing optical energy, said outgoing optical energy being indicative of said property, and
      a photodetector configured to harvest incoming optical energy and convert said incoming optical energy into electrical energy useful to said transmitter,
   wherein said photodetector of said receiver is positioned to receive said outgoing optical energy and said transmitter is configured to emit said outgoing optical energy simultaneously with said photodetector of said sensor node receiving said incoming optical energy.

2. The wireless sensor network of claim 1 wherein said sensor is a temperature sensor.

3. The wireless sensor network of claim 1 wherein said outgoing optical energy includes at least one of a visible light, an infrared light and an ultraviolet light.

4. The wireless sensor network of claim 1 wherein said transmitter includes at least one light emitting diode.

5. The wireless sensor network of claim 1 wherein said sensor node further includes a power converter for regulating said electrical energy generated by said photodetector of said sensor node.

6. The wireless sensor network of claim 1 wherein said sensor node further includes a controller configured to generate and communicate command signals to said transmitter in response to signals received from said sensor.

7. The wireless sensor network of claim 1 wherein said receiver further includes a transmitter.

8. The wireless sensor network of claim 7 wherein said transmitter of said receiver includes at least one light emitting diode.

9. The wireless sensor network of claim 7 wherein said transmitter of said receiver provides said incoming optical energy.

10. The wireless sensor network of claim 7 wherein said transmitter of said sensor node is configured to emit said outgoing optical energy in response to a signal received from said transmitter of said receiver, said signal being detectable by said photodetector of said sensor node.

11. A wireless sensor network comprising:
    a receiver including a photodetector and a transmitter, said transmitter being configured to transmit a beacon; and
    a plurality of sensor nodes positioned on a target subject, each sensor node of said plurality of sensor nodes including:
       a sensor configured to sense a property at a point on said target subject,
       a transmitter configured to emit outgoing optical energy, said outgoing optical energy being indicative of said property, and
       a photodetector positioned to receive said beacon and to harvest incoming optical energy, wherein said incoming optical energy is converted into electrical energy useful to said transmitter of said sensor node,
    wherein said transmitters of said plurality of sensor nodes are configured to emit said outgoing optical energy in response to signals communicated by said beacon, and wherein said photodetector of said receiver is positioned to receive said outgoing optical energy.

12. The wireless sensor network of claim 11 wherein said sensor is a temperature sensor.

13. The wireless sensor network of claim 11 wherein said outgoing optical energy includes at least one of a visible light, an infrared light and an ultraviolet light.

14. The wireless sensor network of claim 11 wherein said transmitter of said sensor node includes at least one light emitting diode.

15. The wireless sensor network of claim 11 wherein said transmitter of said receiver includes at least one light emitting diode.

16. The wireless sensor network of claim 11 wherein each sensor node of said plurality of sensor nodes further includes a power converter for regulating said electrical energy generated by said photodetector of said sensor node.

17. The wireless sensor network of claim 11 wherein each sensor node of said plurality of sensor nodes further includes a controller configured to generate and communicate command signals to said transmitter in response to signals received from said sensor.

18. A wireless sensor network comprising:
    a receiver including
       a first optical transmitter configured to transmit a series of sequences, a first photodetector; and an array of sensor nodes on a target subject, wherein each sensor node includes
- a sensor configured to sense a property of said target subject,
- a second optical transmitter configured to transmit outgoing optical energy related to said property,
- a second photodetector configured to harvest incoming optical energy and convert said incoming optical energy into electrical energy useful by said transmitter, and
- a controller configured to analyze said incoming optical energy and direct said second optical transmitter to transmit said outgoing optical energy when said sequence corresponds to the sensor node;

wherein said first photodetector is configured to receive said outgoing optical energy from each of said sensor nodes; and wherein each of said sequences corresponds to a different one of said sensor nodes.

19. The wireless sensor network of claim 18 wherein said outgoing optical energy includes at least one of a visible light, an infrared light and an ultraviolet light.

* * * * *